Patented Jan. 27, 1942

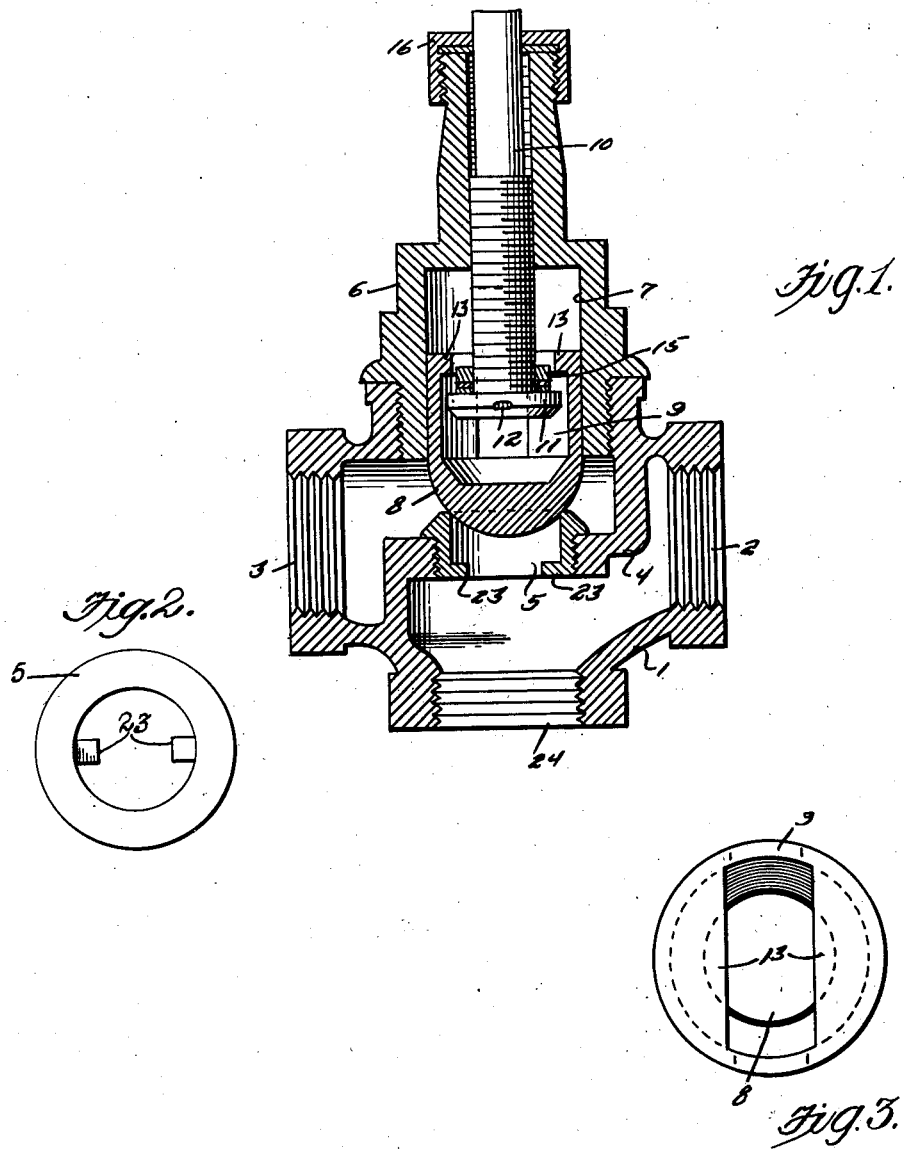

2,271,274

UNITED STATES PATENT OFFICE 2,271,274

VALVE

Joseph E. O'Donnell, Hopewell, Va.

Application March 25, 1941, Serial No. 385,160

1 Claim. (Cl. 251—2)

The present invention relates to new and useful improvements in valves for use particularly on the steam outlet and return of boilers although it will be understood, of course, that the device may be used for any other purpose for which it may be found adapted and desirable.

The primary object of the invention is to provide, in a manner as hereinafter set forth, a valve of the character described which is adapted to function either as a check or non-return valve or a stop valve and which, further, is adapted to be retained in fully open position when desired.

Still another very important object of the invention is to provide a combination valve of the character set forth which may be expeditiously repacked, when desired, without the necessity of taking said valve out of service.

A still further important object of the invention is to provide a combination valve which may be conveniently assembled and disassembled.

Other objects of the invention are to provide a combination valve of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a vertical sectional view of a preferred embodiment of my invention.

Figure 2 is a detail view in top plan of the seat.

Figure 3 is a detail view in top plan of the valve head or member.

Referring now to the drawing in detail, it will be seen that the embodiment of the invention which has been illustrated comprises a casing 1 of suitable metal. The casing 1 is provided with an inlet 2 and an outlet 3. The casing 1 further includes an internal wall or partition 4. Threadedly mounted in the wall 4 is a removable valve seat 5 of substantially the shape shown to advantage in Figure 2 of the drawing.

Screwed into the upper portion of the casing 1 is a removable bonnet 6. The bonnet 6 is formed to provide a cylindrical chamber 7 which communicates with the casing 1. Engageable with the seat 5 and slidable in the cylindrical chamber 7 is a rounded or substantially semi-spherical valve head or member 8. The upper portion of the valve member 8 is formed to provide what may be referred to as a cage 9 which is slidable in the chamber 7.

Threadedly mounted in the upper portion of the bonnet 6 and extending downwardly into the member 8 is a stem 10. Threaded on the lower end portion of the stem 10 and operable in the cage 9 of the member 8 is a collar 11 of suitable metal which is secured by a cotter pin 12. The collar 11 is engageable beneath flanges or the like 13 in the upper end portion of the cage 9 for lifting the valve member 8 out of engagement with the seat 5. The upper portion of the stem 10 may be provided with a suitable hand wheel, or the like, not shown. Encircling the stem 10 and resting on the collar 11 is a sealing ring or gasket 15 which, when the valve member 8 is raised to fully open position, is engageable with the top of the chamber 7 for preventing leakage around the stem 10. A suitable packing 16 is provided on the upper end of the bonnet 6 for the stem 10.

It is thought that the operation of the valve will be readily apparent from a consideration of the foregoing. Briefly, when a check or non-return valve is desired, the stem 10 is threaded or adjusted to the position illustrated in Figure 1 of the drawing. In this position, the member 8 rests in closed position on the seat 5 but is free to move upwardly to open position thereby permitting the passage of the steam or fluid from the inlet 2 to the outlet 3 but preventing the return flow thereof in an obvious manner. When a stop valve is desired the stem 10 is screwed downwardly to lowered position on the member 8 thus positively holding said member in closed position on the seat 5. When it is desired to open the valve and hold it in open position, the stem 10 is screwed upwardly to its uppermost position in the bonnet 6. When this occurs the collar 11 picks up the member 8 and raises said member in the chamber 7. The valve may be expeditiously repacked when necessary without removing it from the line by screwing the stem 10 upwardly in the bonnet 6 as far as said stem will go. This compresses the sealing ring 15 between the collar 11 and the top of the chamber 7 thereby preventing leakage past the stem 10. It will be noted that the construction and arrangement also is such that the seat 5 and member 8 may be conveniently replaced without taking the valve out of the line. Of course, this is accomplished by removing the bonnet 6. Internal lugs 23 facilitate turning the seat 5 with a suitable tool or instrument. The bottom or lower end of the casing 1 is closed by a removable plug 24.

It is believed that the many advantages of a valve constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

A valve comprising a casing, a seat in said casing, a bonnet mounted on the casing and having a substantially cylindrical chamber therein, a valve member engageable with the seat for closing the valve, said member including a cage slidable in the chamber of the bonnet, a stem threadedly mounted in said bonnet and extending into the cage, a collar mounted on the stem and operable in the cage, said stem, when moved in one direction, being engageable with the member for positively securing said member in closed position on the seat, said collar being engageable with the cage for lifting the member out of engagement with the seat after predetermined independent movement of the stem in the opposite direction, and a ring encircling the stem and resting on the collar, said ring being engageable with the bonnet for preventing leakage past the stem when the valve is in fully open position.

JOSEPH E. O'DONNELL.